(12) United States Patent
Fukuchi

(10) Patent No.: US 8,909,060 B2
(45) Date of Patent: Dec. 9, 2014

(54) OPTICAL COMMUNICATION SYSTEM AND OPTICAL COMMUNICATION METHOD

(75) Inventor: Kiyoshi Fukuchi, Minato-ku (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 13/147,079

(22) PCT Filed: Jan. 8, 2010

(86) PCT No.: PCT/JP2010/050136
§ 371 (c)(1),
(2), (4) Date: Jul. 29, 2011

(87) PCT Pub. No.: WO2010/090050
PCT Pub. Date: Aug. 12, 2010

(65) Prior Publication Data
US 2011/0293287 A1    Dec. 1, 2011

(30) Foreign Application Priority Data
Feb. 4, 2009    (JP) ................. 2009-023703

(51) Int. Cl.
*H04B 10/18* (2006.01)
*H04B 10/12* (2006.01)
*H04J 14/02* (2006.01)
*H04B 10/2513* (2013.01)

(52) U.S. Cl.
CPC .... *H04B 10/25133* (2013.01); *H04B 2210/254* (2013.01); *H04B 2210/252* (2013.01)
USPC ............. 398/147; 398/158; 398/159; 398/78; 398/79

(58) Field of Classification Search
USPC ......................... 398/147, 149, 193
See application file for complete search history.

(56) References Cited

U.S. PATENT DOCUMENTS 6,320,687 B1 * 11/2001 Ishikawa ...................... 398/147
7,676,158 B2 * 3/2010 Ghiasi ........................... 398/147
8,538,272 B1 * 9/2013 Robinson et al. ............. 398/158

(Continued)

FOREIGN PATENT DOCUMENTS

CN    101179338 A    5/2008
CN    101272187 A    9/2008

(Continued)

OTHER PUBLICATIONS

D. McGhan, "Electronic Dispersion Compensation", Optical Fiber Conference (OFC), OWKI, Mar. 10, 2006, pp. 1-15.

(Continued)

*Primary Examiner* — Oommen Jacob
(74) *Attorney, Agent, or Firm* — Sughrue Mion, PLLC

(57) ABSTRACT

An optical communication system in which optical transmitter 101 that modulates an electric signal to an optical signal and transmits the optical signal and optical receiver 108 that receives the optical signal are connected via transmission path 107, wherein, when a change in the dispersion amount of chromatic dispersion caused by the optical signal passing through transmission path 107 is nearly eliminated, optical transmitter 101 and optical receiver 108 decrease the absolute value of a receiver-side dispersion compensation amount while keeping the total value of a transmitter-side dispersion compensation amount for compensating for the dispersion amount by optical transmitter 101 and the receiver-side dispersion compensation amount for compensating for the dispersion amount by optical receiver 108 substantially constant.

17 Claims, 10 Drawing Sheets

(56) References Cited

U.S. PATENT DOCUMENTS

| | | |
|---|---|---|
| 2003/0081292 A1* | 5/2003 | Mikami et al. ............... 359/161 |
| 2005/0095007 A1* | 5/2005 | Odate et al. .................. 398/159 |
| 2006/0188263 A1 | 8/2006 | Islam et al. |
| 2007/0286606 A1 | 12/2007 | Antona et al. |
| 2008/0279563 A1* | 11/2008 | Shu ............................ 398/147 |
| 2009/0190929 A1* | 7/2009 | Khurgin et al. ............... 398/79 |
| 2011/0293287 A1* | 12/2011 | Fukuchi ....................... 398/147 |

FOREIGN PATENT DOCUMENTS

| | | |
|---|---|---|
| JP | 01-157112 A | 6/1989 |
| JP | 11-088260 A | 3/1999 |
| JP | 2002-208892 A | 7/2002 |
| JP | 2003-101478 A | 4/2003 |
| JP | 2003-224496 A | 8/2003 |
| JP | 2005-311721 A | 11/2005 |
| JP | 2007-049486 A | 2/2007 |
| JP | 2007-067698 A | 3/2007 |

OTHER PUBLICATIONS

Maurice O'Sullivan, "Expanding network applications with coherent detection", optical fiber communication conference OFC2008, paper NWC, 2008, pp. 1-17.

T. Naito, et al., "Four 5-Gbit/s WDM transmission over 4760-km straight-line using pre- and post-dispersion compensation and FWM cross talk reduction", Optical Fiber Communication Conference, OFC96, paper WM3, 1996, pp. 182-183.

Office Action, dated Sep. 17, 2013, issued by the State Intellectual Property Office of the People's Republic of China, in counterpart Application No. 201080006672.3.

Office Action dated Dec. 24, 2013, issued by the Japan Patent Office in corresponding Japanese Application No. 2010-549416.

* cited by examiner

OPTICAL COMMUNICATION SYSTEM AND OPTICAL COMMUNICATION METHOD

CROSS REFERENCE TO RELATED APPLICATIONS

This application is a National Stage of International Application No. PCT/JP2010/050136 filed Jan. 8, 2010, claiming priority based on Japanese Patent Application No. 2009-023703 filed Feb. 4, 2009, the contents of all of which are incorporated herein by reference in their entirety.

TECHNICAL FIELD

The present invention relates to an optical communication system and optical communication method for compensating for the dispersion amount of chromatic dispersion caused in a transmission path.

BACKGROUND ART

A communication system using an optical fiber is an important technique for realizing long-distance and high-capacity communication. This long-distance and high-capacity communication is realized by a device for modulation/demodulation used for transmission/receiver and the wideband characteristics of an optical fiber to be a transmission path.

Recently, by utilizing the characteristics, a lot of techniques have been realized which enable an optical communication system having such a high-speed interface capacity in which the bit rate is 100 Gbps.

When performing long-distance transmission of an optical signal with a high-speed bit rate of 100 Gbps via an optical fiber transmission path, there is a problem of waveform distortion due to chromatic dispersion of the optical fiber. Chromatic dispersion is a property in which light group delay differs according to the wavelength, and a 1.5 micron band single-mode fiber has a value of 16 to 17 ps/nm/km.

Because the optical transmission pulse is broadened due to this chromatic dispersion, long-distance transmission of an optical signal is difficult. For example, in the case of a 10-Gbps NRZ (Non Return to Zero) signal, an optical signal can be transmitted only for a distance of as far as about 50 to 80 km. Transmission distances become shorter in inverse proportion to the square of bit rate due to chromatic dispersion. Therefore, in the case of a higher-speed bit rate, for example, in the case of 100 Gbps, the transmission distance of an optical signal is 1 km or less when there is chromatic dispersion.

In order to perform long-distance transmission of an optical signal with a high-speed bit rate, it is necessary to compensate for broadening of the optical transmission pulse due to this chromatic dispersion, more accurately, waveform distortion of an optical signal caused by the chromatic dispersion. In current optical communication systems, a dispersion compensation device such as a dispersion compensation fiber is used to compensate for the waveform distortion.

The dispersion compensation device is provided with a dispersion compensation amount that has an absolute value substantially equal to that of the dispersion amount of chromatic dispersion caused in a transmission path and an opposite sign. As a result, the transfer function of the dispersion compensation device is an inverse function of the transfer function of the transmission path. Hereinafter, the dispersion amount of chromatic dispersion will be referred to simply as the dispersion amount.

Since the process in which waveform distortion is caused by chromatic dispersion is a linear process, the dispersion amount caused on a transmission path is compensated for by the dispersion compensation amount given by a dispersion compensation device by connecting the transmission path and the dispersion compensation device in series. As a result, the waveform of an optical signal is restored at output of the dispersion compensation device. Thereby, even in a transmission path where chromatic dispersion occurs, long-distance transmission of an optical signal with a high-speed bit rate is realized.

In comparison, in a wavelength-division multiplexing optical network which will be widely developed in the future, route switching by an optical switch or the like is performed to realize flexible route setting. In such a wavelength-division multiplexing optical network, the dispersion amount also changes when route switching is performed.

There has been practically used a device which is called a VIPA (Virtually-Imaged Phase Array) and which enables the dispersion compensation amount to be variable in response to a change in the dispersion amount. However, the transmission distance which enables the dispersion compensation amount to be variable is as short as tens of kilometers in the case of a signal with a bit rate of 10 Gbps, and therefore, the device cannot cope with route switching accompanied by great distance fluctuation.

For example, Non Patent Literature 1 discloses a technique for compensating for the dispersion amount of chromatic dispersion by processing an electric signal in an optical-signal-transmitter-side apparatus. As described above, the process in which waveform distortion is caused by chromatic dispersion is a linear process. Therefore, the dispersion compensation device for compensating for the dispersion amount caused in a transmission path may be arranged before or after the transmission path. In the technique disclosed in Non Patent Literature 1, a dispersion compensation device is provided in the optical-signal-transmitter-side apparatus, which is positioned before a transmission path.

As an example of a dispersion compensation device, a transversal filter configured as shown in FIG. 1 can be given.

Transversal filter 10 shown in FIG. 1 is provided with multiple delay elements 11, multiple multipliers 12 and adder 13.

In the technique disclosed in Non Patent Literature 1, the dispersion amount is compensated for, for example, by the transversal filter shown in FIG. 1 for an electric signal inputted to the optical-signal-transmitter-side apparatus. An operation in which the dispersion amount is compensated for by the transversal filter shown in FIG. 1 will be described below.

Electric signal 20 inputted to the optical-signal-transmitter-side apparatus is given different delays by multiple delay elements 11 as shown in FIG. 1.

An output signal from each delay element 11 is inputted to next-stage delay element 11 and multiplier 12. The signal inputted to multiplier 12 is referred to as a branch signal.

The signal inputted to the next-stage delay element 11 is further given delay by that delay element 11. On the other hand, the branch signal inputted to multiplier 12 is multiplied by a tap coefficient outputted from circuit coefficient control device 14.

Then, the signal multiplied by the tap coefficient by each multiplier 12 is inputted to adder 13, and the sum total is determined by adder 13. As the delay interval of delay given by each delay element 11, for example, a value equal to the half of the symbol time of a signal to be transmitted is used.

The tap coefficient provided from circuit coefficient control device 14 is a value determined by an impulse response of a transfer function. Since the transfer function due to chromatic dispersion is a complex function, this tap coefficient is a complex number. Therefore, an output after compensation of the dispersion amount is also a complex signal.

Then, an optical signal is modulated with the use of complex signal 21 for which the dispersion amount has been compensated for. Actually, an IQ converter included in the transmitter-side apparatus applies the real part of complex signal 21 to the in-phase component (cosine component) of the optical signal, and the imaginary part of the complex signal to the orthogonal component (sine component) of the optical signal. An IQ converter is an apparatus for dividing an inputted signal into a signal in phase (I) and a signal with a phase orthogonal to the in-phase signal (Q).

In the technique disclosed in Non Patent Literature 1, since the transfer function can be freely changed by changing the tap coefficient outputted from circuit coefficient control device 14 to transversal filter 10, it is possible to variably compensate for the dispersion amount in a wide range.

It is also theoretically possible to apply the above technique disclosed in Non Patent Literature 1 to an optical-signal-receiver-side apparatus. In an optical receiver which is widely used at present, however, information of a complex signal is lost due to square-law detection at the time of converting an optical signal to an electric signal by a photodiode.

In comparison, in a technique disclosed in Non Patent Literature 2, each item of information regarding the in-phase component (cosine component) of the electric field of a received optical signal and information regarding the orthogonal component (sine component) is abstracted by performing coherent optical receiver to make a phase diversity receiver configuration.

By obtaining a complex electric field signal of the optical electric field of the received optical signal and processing this complex electric field signal with a transversal filter, it is made possible to compensate for the dispersion amount.

The capability of compensating for the dispersion amount is substantially the same between the case of performing the compensation on a transmitter side and the case of performing the compensation on a receiver side, within a range in which deterioration due to the nonlinear effect of the system can be ignored. However, in the case where the dispersion amount of a transmission path changes due to route switching by an optical switch or the like in a wavelength-division multiplexing optical network, waveform distortion caused by the change in the dispersion amount can be detected only on the receiver side, and the transmitter side cannot detect the waveform distortion. In the case of compensating for the dispersion amount on the receiver side, it is possible to quickly optimize the receiver state by adaptive equalization because the state of waveform distortion can be always checked on the receiver side.

Here, in compensating for the dispersion amount by a transversal filter, the number of delay elements required to compensate for the same dispersion amount and the number of branch signals outputted from the delay elements (hereinafter referred to as the number of taps) significantly increase as the bit rate of an optical signal is higher. Therefore, the scale of a circuit for compensating for the dispersion amount becomes significantly large.

As a method for preventing the scale of the circuit for compensating for the dispersion amount from becoming significantly large, there is a method in which compensating for the dispersion amount is divided into tasks to be performed on the transmitter side and on the receiver side. A technique therefore is disclosed, for example, in Non Patent Literature 3.

Non Patent Literature 3 discloses a system which compensates for the dispersion amount in an optical transmitter and an optical receiver by utilizing optical fibers. By arranging a dispersion compensation fiber for the optical transmitter and the optical receiver, the dispersion compensation amount for the optical transmitter and the optical received is decreased. This prevents the scale of the circuit for compensating for the dispersion amount from becoming large.

CITATION LIST

Non Patent Literature

Non Patent Literature 1: D. McGhan, "Electronic Dispersion Compensation", optical fiber communication conference OFC2006, paper OWK1, 2006

Non Patent Literature 2: Maurice O'Sullivan, "Expanding network applications with coherent detection", optical fiber communication conference OFC2008, paper NWC3, 2008

Non Patent Literature 3: T. Naito, et al., "Four 5-Gbit/s WDM transmission over 4760-km straight-line using pre- and post-dispersion compensation and FWM cross talk reduction", Optical Fiber Communication Conference, OFC96, paper WM3, 1996

SUMMARY OF INVENTION

Technical Problem

However, in the system disclosed in Non Patent Literature 3, the optical transmitter cannot change the dispersion compensation amount at the optical transmitter in response to change in the dispersion amount because it does not know the dispersion compensation amount at the optical receiver.

As a result, there is a problem in which the size of a network for the dispersion compensation amount that can be optimized is limited by the range of the dispersion compensation amount which can be compensated for on the receiver side.

The object of the present invention is to provide an optical communication system and optical communication method which solve the above problem.

Solution to Problem

In order to achieve the above object, the present invention is:

an optical communication system in which an optical transmitter that modulates an electric signal to an optical signal and transmits the optical signal, and an optical receiver that receives the optical signal are connected via a first transmission path, wherein when a change in the dispersion amount of chromatic dispersion caused by the optical signal passing through said first transmission path is nearly eliminated, said optical transmitter and said optical receiver decrease the absolute value of a receiver-side dispersion compensation amount while keeping the total value of a transmitter-side dispersion compensation amount for compensating for the dispersion amount by said optical transmitter and the receiver-side dispersion compensation amount for compensating for the dispersion amount by said optical receiver substantially constant.

The present invention is also an optical communication method in an optical communication system in which an optical transmitter that modulates an electric signal to an optical signal and transmits the optical signal and an optical receiver that receives the optical signal are connected via a first transmission path and a second transmission path, the optical communication method comprising:

a step of, when a change in the dispersion amount of chromatic dispersion caused by the optical signal passing through the first transmission path is nearly eliminated, decreasing the absolute value of a receiver-side dispersion compensation amount while keeping the total value of a transmitter-side dispersion compensation amount for compensating for the dispersion amount by the optical transmitter and the receiver-side dispersion compensation amount for compensating for the dispersion amount by the optical receiver substantially constant.

Advantageous Effects of Invention

According to the present invention, when a change in the dispersion amount of chromatic dispersion caused by an optical signal passing through a transmission path is nearly eliminated, the absolute value of the receiver-side dispersion compensation amount is decreased while the total value of the transmitter-side dispersion compensation amount for compensating for the dispersion amount by an optical transmitter and the receiver-side dispersion compensation amount for compensating for the dispersion amount by an optical receiver is kept substantially constant. Thereby, the range capable of changing the receiver-side dispersion compensation amount is secured to the maximum. Therefore, it is possible to prevent the size of a network capable of optimizing the dispersion compensation amount from being limited by the range of the dispersion compensation amount which can be compensated for by the optical receiver without enlarging the scale of the circuit for compensating for the dispersion amount.

DESCRIPTION OF EMBODIMENTS

Exemplary embodiments will be described below with reference to drawings.

First Exemplary Embodiment

Figure 2:
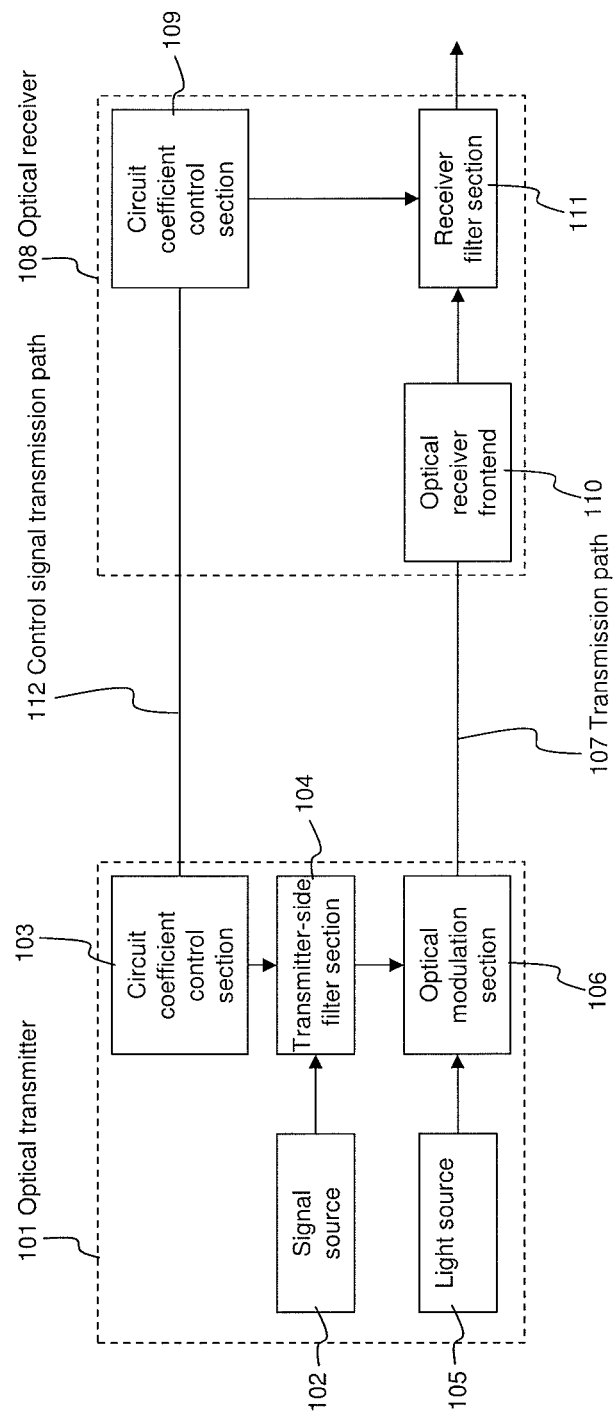
FIG. 2 is a block diagram showing the configuration of a first exemplary embodiment of an optical communication system of the present invention.

FIG. 2 is a block diagram showing the configuration of a first exemplary embodiment of an optical communication system of the present invention.

As shown in FIG. 2, the optical communication system of this exemplary embodiment is provided with optical transmitter 101 and optical receiver 108, and optical transmitter 101 and optical receiver 108 are connected via transmission path 107 which is a first transmission path for transmitting a data signal and control signal transmission path 112 which is a second transmission path.

Optical transmitter 101 is provided with signal source 102, circuit coefficient control section 103 which is a first circuit coefficient control section, transmitter-side filter section 104, light source 105 and optical modulation section 106.

Signal source 102 outputs a digital data signal which is an electric signal. Here, the bit rate of a digital data signal is assumed to be 10 Gbps. However, this is an example, and the bit rate is not limited thereto.

Figure 1:
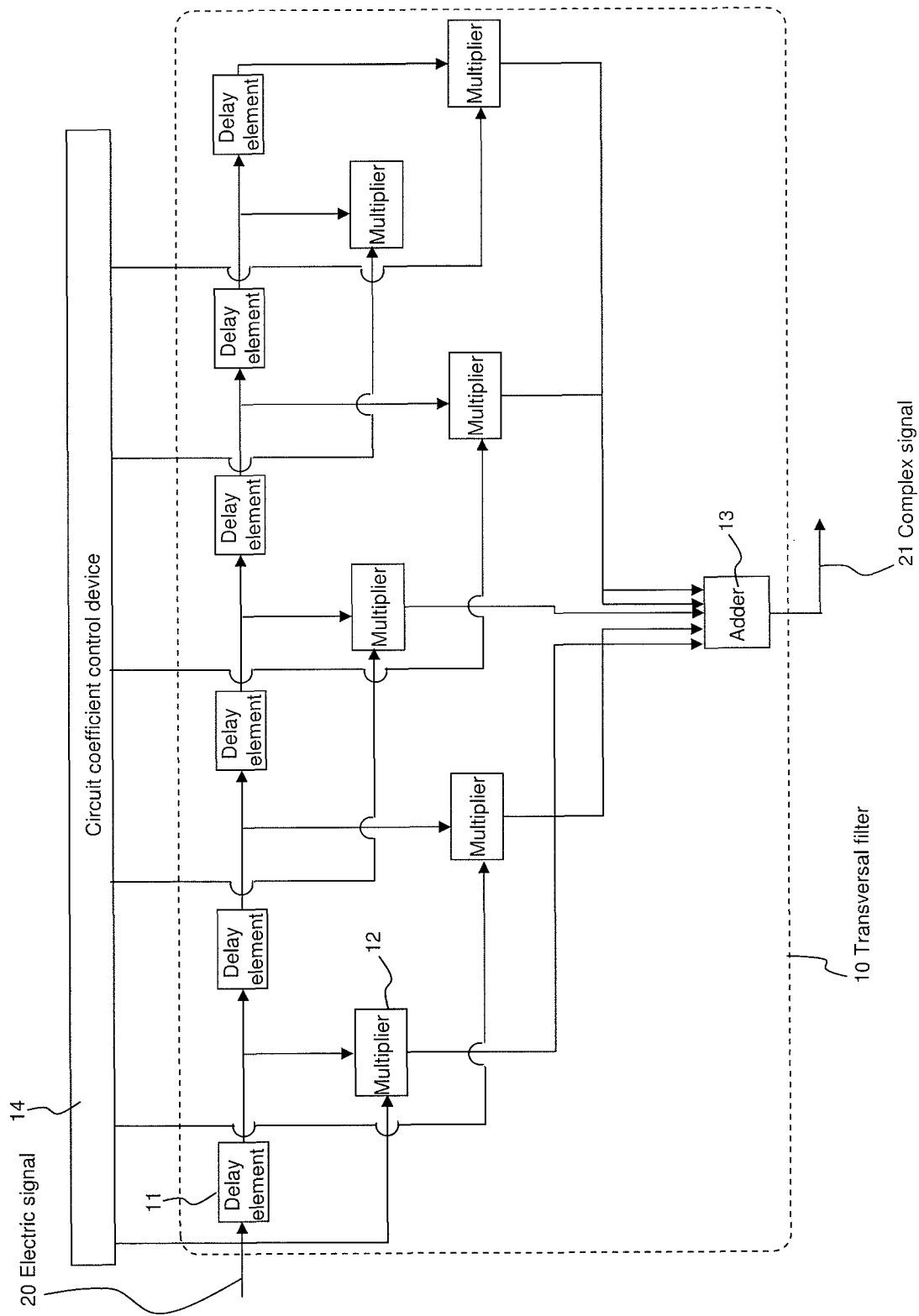
FIG. 1 is a block diagram showing an example of the configuration of a transversal filter.

Transmitter-side filter section 104 is a transversal filter as shown in FIG. 1. Transmitter-side filter section 104 performs linear processing of a digital data signal outputted from signal source 102 by a transfer function controlled by circuit coefficient control section 103. Then, transmitter-side filter section 104 gives a signal corresponding to a variable dispersion compensation amount between −10000 ps/nm and +10000 ps/nm to the digital data signal and outputs it as a transmitted signal. The delay interval by delay elements (see FIG. 1) included in the transversal filter is 50 ps corresponding to half of 100 ps which is the symbol time of data. This delay interval 50 ps is an example, and the delay interval can be any arbitrary value in addition to a value obtained by dividing the symbol time by a natural number. Hereinafter, the dispersion compensation amount given by transmitter-side filter section 104 will be referred to as a transmitter-side dispersion compensation amount.

Circuit coefficient control section 103 controls a transfer function used by transmitter-side filter section 104 at the time of performing linear processing of a digital data signal outputted from signal source 102. Specifically, the function of control is to set and output a tap coefficient by which a branch signal of a signal outputted from each delay element (see FIG. 1) is to be multiplied in the transversal filter included in transmitter-side filter section 104. By setting the tap coefficient to a value corresponding to a predetermined dispersion amount to be compensated for, the predetermined dispersion amount is compensated for. By changing this tap coefficient, the transmitter-side dispersion compensation amount can be changed. When receiving a first start instruction for starting change in the transmitter-side dispersion compensation amount from optical receiver 108 via control signal transmission path 112, circuit coefficient control section 103 changes the transmitter-side dispersion compensation amount toward a direction indicated by the first start instruction.

Light source 105 outputs light with a constant intensity with a DFB (Distributed FeedBack) laser. The light outputted from light source 105 may be any light if it has the degree of quality that is required for optical communication and is not limited to that of a DFB laser.

Optical modulation section 106 is an IQ modulator, and it divides an optical signal outputted from light source 105 into an in-phase component and an orthogonal component. Then, optical modulation section 106 applies information of an in-phase component included in a transmitted signal outputted from transmitter-side filter section 104 to the divided in-phase component and applies information of an orthogonal component included in the transmitted signal outputted from transmitter-side filter section 104 to the divided orthogonal component. Then, optical modulation section 106 transmits the optical signal to which the information of the in-phase component and orthogonal component is applied, to optical receiver 108 via transmission path 107. As described above, optical modulation section 106 is a modulator called an IQ modulator (or a vector modulator). Since an IQ modulator is a general modulator widely used for a quadrature phase shift keying (QPSK) modulation system and the like, detailed description thereof will be omitted here.

Optical receiver 108 shown in FIG. 2 is provided with circuit coefficient control section 109 which is a second circuit coefficient control section, optical receiver frontend 110 and receiver filter section 111.

Using a coherent optical receiver system, optical receiver frontend 110 receives an optical signal transmitted from optical transmitter 101 via transmission path 107 and detects an in-phase component signal and an orthogonal component signal. Then, optical receiver frontend 110 outputs the detected in-phase component signal and orthogonal component signal to receiver filter section 111 as received signals.

Receiver filter section 111 is a transversal filter as shown in FIG. 1 similarly to transmitter-side filter section 104. Receiver filter section 111 performs linear processing of a received signal outputted from optical receiver frontend 110 by a transfer function controlled by circuit coefficient control section 109. Then, receiver filter section 111 gives a signal corresponding to a variable dispersion compensation amount between −10000 ps/nm and +10000 ps/nm to the received signal and outputs it. The delay interval by delay elements (see FIG. 1) included in the transversal filter is 50 ps corresponding to half of the symbol time of data 100 ps. This delay interval 50 ps is an example, and the delay interval can be any arbitrary value in addition to a value obtained by dividing symbol time by a natural number. Receiver filter section 111 detects the dispersion amount of the received signal outputted from optical receiver frontend 110 and performs adaptive equalization so as to minimize the dispersion amount in response to an instruction from circuit coefficient control section 109. Hereinafter, the dispersion compensation amount given by receiver filter section 111 will be referred to as a receiver-side dispersion compensation amount.

Similarly to circuit coefficient control section 103, circuit coefficient control section 109 controls a transfer function used by receiver filter section 111 at the time of performing linear processing of a received signal outputted from optical receiver frontend 110. Specifically, the function of control is to set and output a tap coefficient by which a branch signal of a signal outputted from each delay element (see FIG. 1) is to be multiplied in the transversal filter included in receiver filter section 111. By setting the tap coefficient to a value corresponding to a predetermined dispersion amount to be compensated for, the predetermined dispersion amount is compensated for. By changing this tap coefficient, the receiver-side dispersion compensation amount can be changed. Circuit coefficient control section 109 monitors the dispersion amount detected by receiver filter section 111. When detecting change in the dispersion amount, circuit coefficient control section 109 causes receiver filter section 111 to perform adaptive equalization so as to minimize the change amount of the change in the dispersion amount. Circuit coefficient control section 109 transmits a first start instruction to circuit coefficient control section 103 via control signal transmission path 112.

Description will be made below on an operation of compensating for the dispersion amount of chromatic dispersion in the optical communication system configured as described above.

Figure 3:
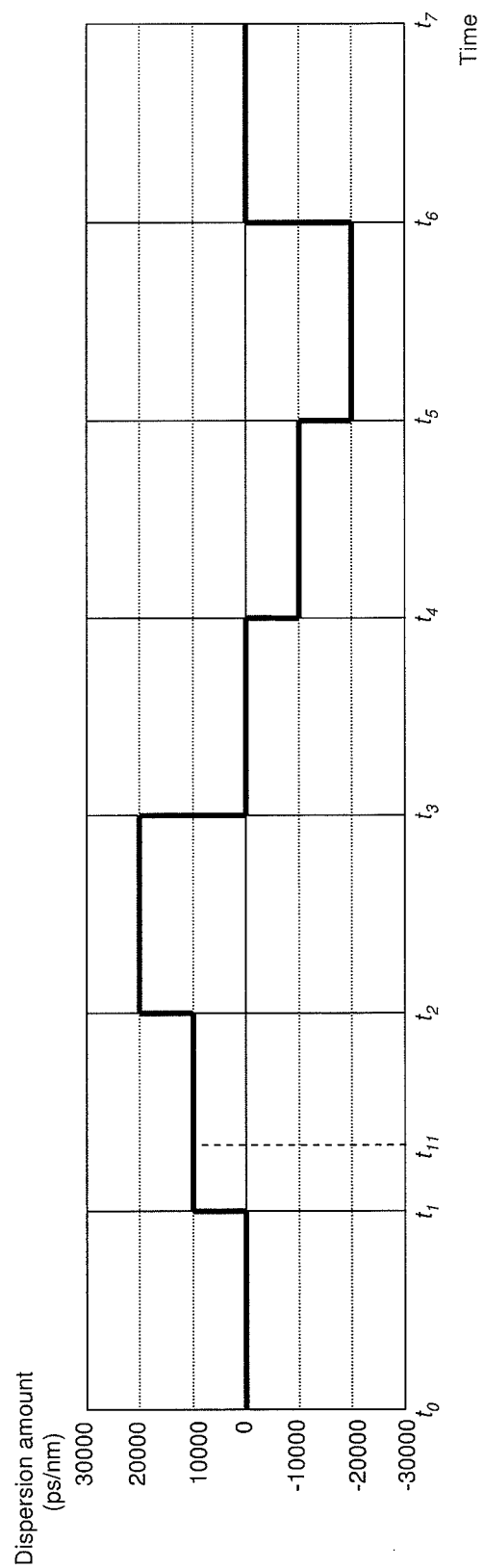
FIG. 3 is a time chart showing change in the dispersion amount of chromatic dispersion caused in a transmission path by switching the route of the transmission path shown in FIG. 2.

FIG. 3 is a time chart showing change in the dispersion amount of chromatic dispersion caused in transmission path 107 by switching the route of transmission path 107 shown in FIG. 2.

Figure 4:
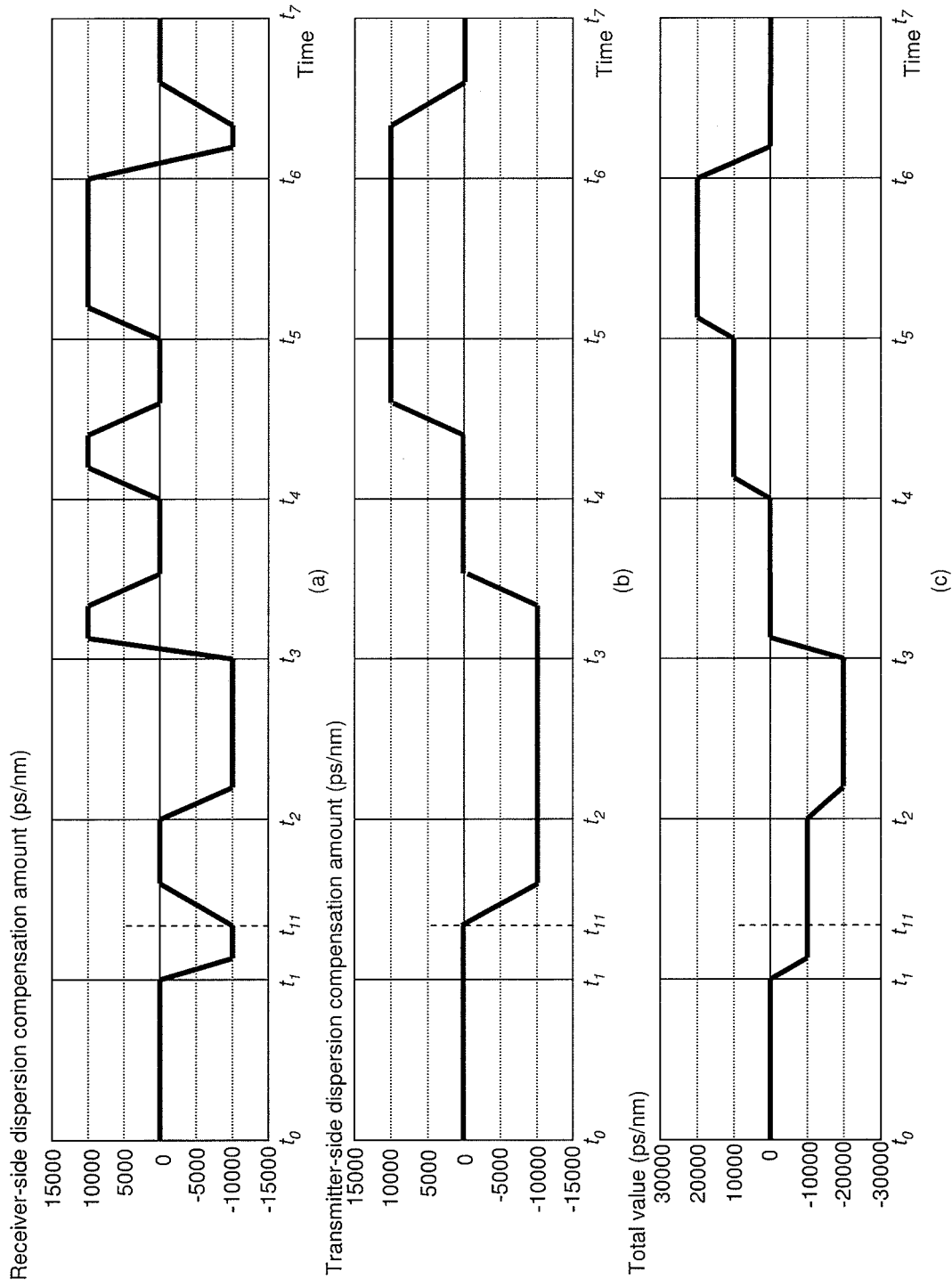
FIG. 4 is a time chart showing change in the dispersion compensation amount in a transmitter-side filter section and a receiver filter section shown in FIG. 2, corresponding to the change in the dispersion amount shown in FIG. 3.

FIG. 4 is a time chart showing change in the dispersion amount in transmitter-side filter section 104 and receiver filter section 111 shown in FIG. 2, corresponding to the change in the dispersion amount shown in FIG. 3. FIG. 4(a) is a time chart showing change in the receiver-side dispersion compensation amount in receiver filter section 111; FIG. 4(b) is a time chart showing change in the transmitter-side dispersion compensation amount in transmitter-side filter section 104; and FIG. 4(c) is a time chart showing change in the total value of the transmitter-side dispersion compensation amount and the receiver-side dispersion compensation amount.

Figure 5:
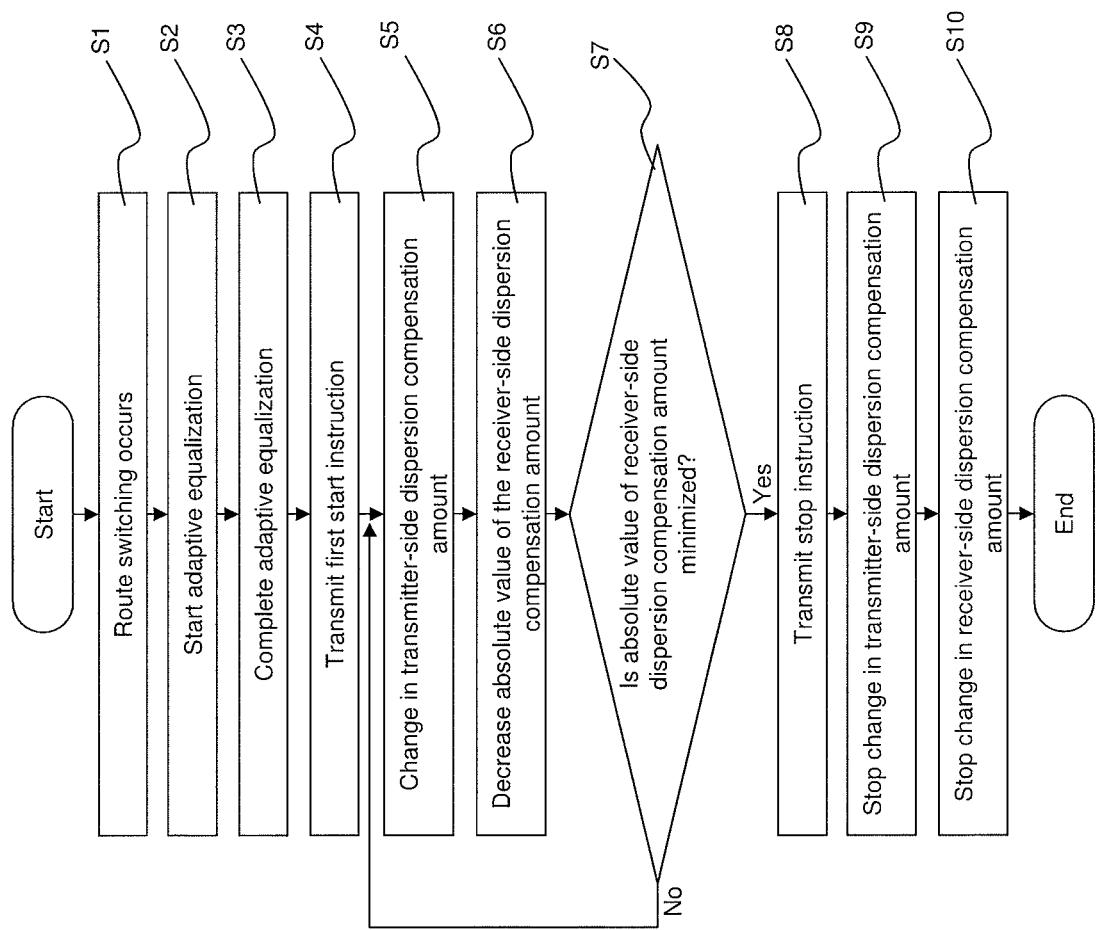
FIG. 5 is a flowchart for illustrating an operation of compensating for the dispersion amount in the optical communication system shown in FIG. 2.

FIG. 5 is a flowchart for illustrating an operation of compensating for the dispersion amount in the optical communication system shown in FIG. 2.

First, at time $t_1$ shown in FIGS. 3 and 4, route switching occurs (step S1).

At this time, the dispersion amount caused on transmission path 107 shown in FIG. 2 increases to 10000 ps/nm, as shown in FIG. 3.

When detecting this change in the dispersion amount, circuit coefficient control section 109 causes receiver filter section 111 to start adaptive equalization for minimizing the change amount of this change in the dispersion amount (step S2).

Then, circuit coefficient control section 109 completes the adaptive equalization by receiver filter section 111 when the receiver-side dispersion compensation amount becomes −10000 ps/nm as shown in FIG. 4(a). As a result, the total value of the transmitter-side dispersion compensation amount and the receiver-side dispersion compensation amount is stabilized at −10000 ps/nm as shown in FIG. 4(c).

At time $t_{11}$ which is suitable time after communication is resumed in this stabilization state, circuit coefficient control section 109 transmits a first start instruction for decreasing the transmitter-side dispersion compensation amount (increasing the absolute value with a negative dispersion amount) to circuit coefficient control section 103 via control signal transmission path 112 (step S4).

When receiving the first start instruction transmitted from circuit coefficient control section 109, circuit coefficient control section 103 decreases the transmitter-side dispersion compensation amount in transmitter-side filter section 104 (step S5). Thereby, the transmitter-side dispersion compensation amount becomes −10000 ps as shown in FIG. 4(b). At the same time, circuit coefficient control section 109 decreases the absolute value of the receiver-side dispersion compensation amount in receiver filter section 111 (step S6). Specifically, the dispersion compensation amount in receiver filter section 111 is increased to ±0 ps/nm as shown in FIG. 4(a).

At this time, the transmitter-side dispersion compensation amount and the receiver-side dispersion compensation amount each change while the total value of the transmitter-side dispersion compensation amount and the receiver-side dispersion compensation amount is kept substantially constant. Specifically, circuit coefficient control section 109 changes the receiver-side dispersion compensation amount in receiver filter section 111 according to the dispersion amount detected by receiver filter section 111.

Thereby, communication can be continued without occurrence of chromatic dispersion on transmission path 107 even while optical transmitter 101 and optical receiver 108 each change the dispersion compensation amount.

Next, circuit coefficient control section 109 judges whether the absolute value of the receiver-side dispersion compensation amount has been minimized (step S7).

If the absolute value of the receiver-side dispersion compensation amount has not been minimized as a result of judgment at step S7, the operation proceeds to the operation of step S5, and circuit coefficient control section 103 causes transmitter-side filter section 104 to continue decreasing the transmitter-side dispersion compensation amount, and circuit coefficient control section 109 causes receiver filter section 111 to continue increasing the receiver-side dispersion compensation amount.

On the other hand, if the absolute value of the receiver-side dispersion compensation amount has been minimized as a result of the judgment at step S7, circuit coefficient control section 109 transmits a stop instruction for stopping change in the transmitter-side dispersion compensation amount to circuit coefficient control section 103 via control signal transmission path 112 (step S8).

When receiving the stop instruction transmitted from circuit coefficient control section 109, circuit coefficient control section 103 stops a decrease in the transmitter-side dispersion compensation amount in transmitter-side filter section 104 (step S9).

Then, circuit coefficient control section 109 stops an increase in the receiver-side dispersion compensation amount in receiver filter section 111 (step S10).

The above is the operation of compensating for the dispersion amount of chromatic dispersion caused in transmission path 107 by route switching which occurs at the time $t_1$ shown in FIG. 3, in the optical communication system shown in FIG. 2.

Description will be made below on an operation of compensating for chromatic dispersion for change in the dispersion amount after the $t_1$ shown in FIG. 3. However, the operation is basically similar to the operation described above, and therefore, its flowchart will be omitted.

As shown in FIG. 3, at time $t_2$ which is the next route switching time, the dispersion amount of transmission path 107 shown in FIG. 2 increases to 20000 ps/nm.

At this time, the transmitter-side dispersion compensation amount is already −10000 ps/nm as shown in FIG. 4(b) and cannot be decreased any more. Therefore, circuit coefficient control section 109 causes receiver filter section 111 to perform adaptive equalization to change the receiver-side dispersion compensation amount to −10000 ps/nm as shown in FIG. 4(a). Thereby, the normal communication state can be obtained.

After that, circuit coefficient control section 109 transmits a first start instruction to circuit coefficient control section 103 to decrease the transmitter-side dispersion compensation amount, in order to decrease the absolute value of the receiver-side dispersion compensation amount. However, since the transmitter-side dispersion compensation amount cannot be decreased any more in transmitter-side filter section 104, the transmitter-side dispersion compensation amount does not change. As a result, the transmitter-side dispersion compensation amount and the receiver-side dispersion compensation amount are equally stabilized at −10000 ps/nm as shown in FIGS. 4(a) and 4(b).

Next, as shown in FIG. 3, at time $t_3$ which is the next route switching time, the dispersion amount of transmission path 107 shown in FIG. 2 decreases to 0 ps/nm.

At this time, as shown in FIG. 4(b), the transmitter-side dispersion compensation amount in transmitter-side filter section 104 is already −10000 ps/nm. Therefore, receiver filter section 111 causes the receiver-side dispersion compensation amount to be +10000 ps/nm by adaptive equalization as shown in FIG. 4(a). Thereby, the normal communication state can be obtained.

At this time, circuit coefficient control section 109 transmits a first start instruction to circuit coefficient control section 103 to increase the transmitter-side dispersion compensation amount, in order to decrease the absolute value of the receiver-side dispersion compensation amount.

Circuit coefficient control section 103 which has received the first start instruction transmitted from circuit coefficient control section 109 increases the transmitter-side dispersion compensation amount to ±0 ps/nm as shown in FIG. 4(b). At this time, circuit coefficient control section 109 decreases the absolute value of the receiver-side dispersion compensation amount. Specifically, the dispersion compensation amount in receiver filter section 111 is decreased to ±0 ps/nm as shown in FIG. 4(a). At this time, the transmitter-side dispersion compensation amount and the receiver-side dispersion compensation amount each change while the total value of the transmitter-side dispersion compensation amount and the receiver-side dispersion compensation amount is kept substantially constant.

As shown in FIG. 3, in each of the cases where the dispersion amount changes to −10000 ps/nm at time $t_4$, the case where the dispersion amount changes to −20000 ps/nm at time $t_5$, and the case where the dispersion amount changes to 0 ps/nm at time $t_6$ also, a similar operation is performed.

Thus, in this exemplary embodiment, when a change in the dispersion amount of chromatic dispersion caused by an optical signal passing through a transmission path is nearly eliminated, the absolute value of the receiver-side dispersion compensation amount is decreased while the total value of the transmitter-side dispersion compensation amount for compensating for the dispersion amount by optical transmitter 101 and the receiver-side dispersion compensation amount for compensating for the dispersion amount by optical receiver 108 is kept substantially constant. Thereby, the range capable of changing the receiver-side dispersion compensation amount is secured to the maximum. Therefore, it is possible to prevent the size of a network capable of optimizing the dispersion compensation amount from being limited by the range of the dispersion compensation amount which can be compensated for by optical receiver 108 without enlarging the scale of the circuit for compensating for the dispersion amount.

Here, if it is assumed that dispersion compensation by route switching is performed only on the receiver side, the range of the dispersion compensation amount is limited to the range of −10000 ps/nm to +10000 ps/nm which is the range of the receiver-side dispersion compensation amount.

An operation performed in this case will be described below, with the case where a change in the dispersion amount of chromatic dispersion shown in FIG. 3 is caused given as an example.

First, when the chromatic dispersion increases to 10000 ps/nm after route switching at the time $t_1$, the receiver side performs adaptive equalization. When the receiver-side dispersion compensation amount becomes −10000 ps/nm and is stabilized there, communication is resumed. After that, since the dispersion compensation amount is not moved between the transmitter side and the receiver side, the transmitter-side dispersion compensation amount does not change, keeping 0 ps/nm, and the receiver-side dispersion compensation amount does not change, keeping −10000 ps/nm.

In this state, dispersion of the route increases to 20000 ps/nm at the next route switching time $t_2$ as shown in FIG. 3. At this time, since the transmitter-side dispersion compensation amount is ±0 ps/nm, the receiver side attempts to decrease the chromatic dispersion by adaptive equalization. However, the receiver-side dispersion compensation amount is already −10000 ps/nm, which is its limit value, and therefore, it is not possible to increase the dispersion compensation amount.

Thus, in the case where the dispersion compensation amount is not moved between the transmitter side and the receiver side, the dispersion compensation amount of the whole optical communication system is limited to the range of −10000 to +10000 ps/nm which is the range of the dispersion compensation amount the receiver side can compensate for.

Second Exemplary Embodiment

In the first exemplary embodiment described above, adaptive equalization in optical receiver 108 is used to change the receiver-side dispersion compensation amount in response to change in the dispersion amount caused by route switching of transmission path 107. Thereby, in the first exemplary embodiment, the configuration of the optical communication system can be simplified. However, at the time point when adaptive equalization is started, the dispersion amount of transmission path 107 has already changed, and deterioration in communication quality easily occurs because of fluctuation in other deterioration factors such as fluctuation in polarization mode dispersion.

Furthermore, because adaptive equalization itself requires much time, it is difficult to significantly change the transmitter-side dispersion compensation amount and the receiver-side dispersion compensation amount in the case where route switching frequently occurs for a short time.

In a second exemplary embodiment described below, change in the dispersion amount of transmission path 107 is coped with not by adaptive equalization in an optical receiver but by embedding a control start frame for instructing change in the receiver-side dispersion compensation amount into a transmitted signal and transmitting the signal to the optical receiver, and by the optical transmitter and the optical receiver changing the dispersion compensation amount in synchronization with each other.

Figure 6:
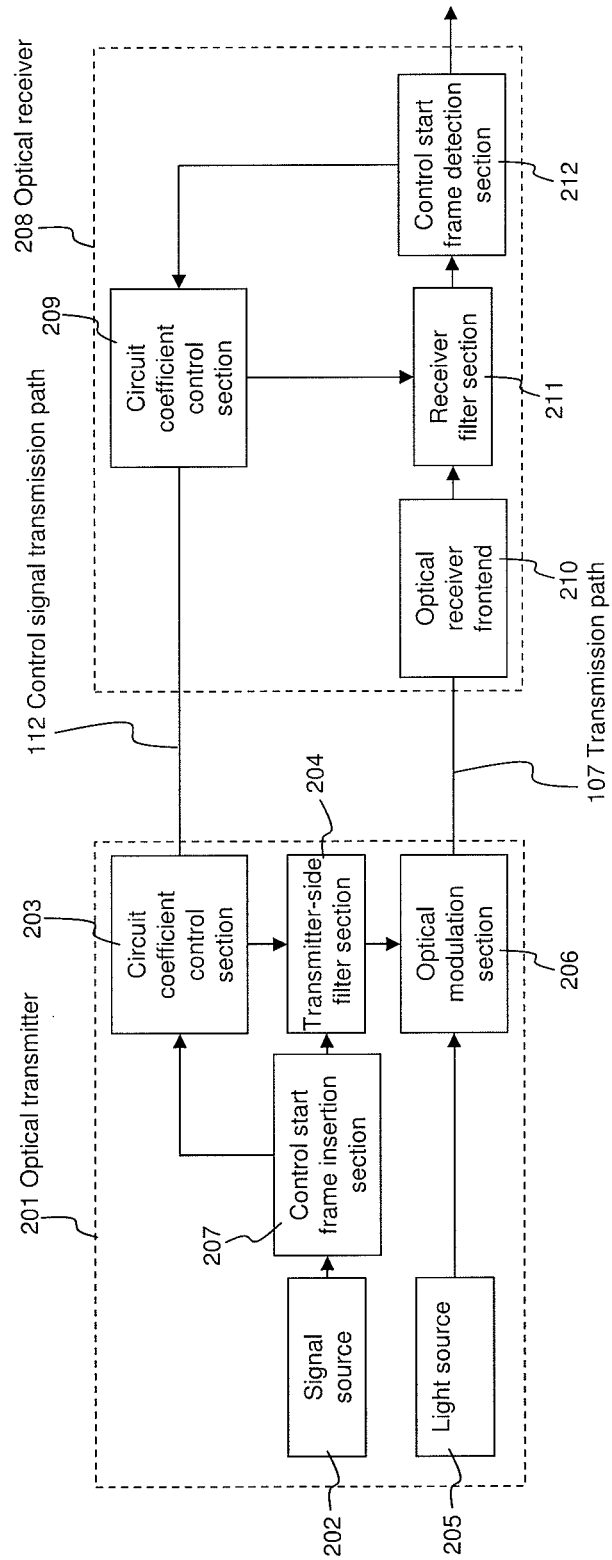
FIG. 6 is a block diagram showing the configuration of a second exemplary embodiment of the optical communication system of the present invention.

FIG. 6 is a block diagram showing the configuration of the second exemplary embodiment of the optical communication system of the present invention.

When compared with the optical communication system of the first exemplary embodiment shown in FIG. 2, the optical communication system of this exemplary embodiment differs in that optical transmitter 201 is provided with control start frame insertion section 207 and optical receiver 208 is provided with control start frame detection section 212, as shown in FIG. 6.

When circuit coefficient control section 203 changes the transmitter-side dispersion compensation amount, control start frame insertion section 207 inserts a control start frame into a digital data signal outputted from signal source 202. Then, control start frame insertion section 207 outputs the digital data signal in which the control start frame is inserted and insertion information indicating that the control start frame has been inserted.

When a predetermined time elapses after receiving the insertion information outputted from control start frame insertion section 207, circuit coefficient control section 203 changes the transmitter-side dispersion compensation amount in transmitter-side filter section 204.

When detecting a control start frame in a received signal outputted from receiver filter section 211, control start frame detection section 212 outputs detection information for notifying that the control start frame has been detected, to circuit coefficient control section 209.

When a predetermined time elapses after receiving the detection information outputted from control start frame detection section 212, circuit coefficient control section 209 changes the receiver-side dispersion compensation amount in receiver filter section 211.

In this exemplary embodiment, when compensation of the dispersion amount of transmission path 107 is completed by causing the transmitter-side dispersion compensation amount and the receiver-side dispersion compensation amount to change in synchronization with each other, using a control start frame, the operation of causing the receiver-side dispersion compensation amount and the transmitter-side dispersion compensation amount to change in synchronization with each other in order to decrease the absolute value of the receiver-side dispersion compensation amount is performed as described in the above first exemplary embodiment.

Thus, in this exemplary embodiment, optical transmitter 201 transmits a control start frame for instructing change in the receiver-side dispersion compensation amount, to optical receiver 208. Therefore, it is possible to compensate for the dispersion amount of transmission path 107 quickly and at a more accurate timing.

In this exemplary embodiment, circuit coefficient control section 203 accepts insertion information from control start frame insertion section 207, and changes the transmitter-side dispersion compensation amount when a predetermined time elapses after accepting the insertion information. Instead of using such a method, for example, it is also possible for circuit coefficient control section 203 to instruct control start frame insertion section 207 to insert a control start frame, and change the transmitter-side dispersion compensation amount when a predetermined time elapses after giving this instruction.

Third Exemplary Embodiment

In the second exemplary embodiment described above, the timing of changing the transmitter-side dispersion compensation amount and the receiver-side dispersion compensation amount is controlled by using a control start frame between an optical transmitter and an optical receiver. In this case, since the control start frame is inserted into a transmitted signal, the bit rate of transmission path 107 changes, and there is a possibility that a component with an existing transmission speed cannot be used.

In a third exemplary embodiment described below, an optical transmitter uses control signal transmission path 112 to instruct an optical receiver to start change in the receiver-side dispersion compensation amount.

Figure 7:
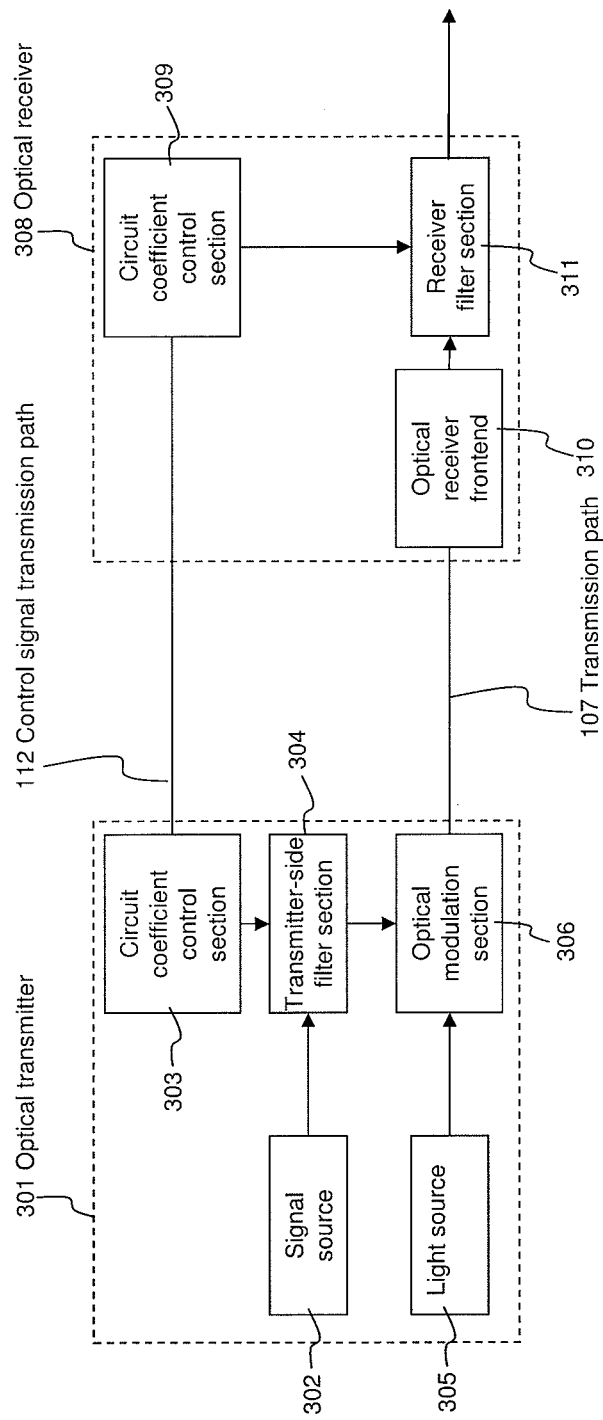
FIG. 7 is a block diagram showing the configuration of a third exemplary embodiment of the optical communication system of the present invention.

FIG. 7 is a block diagram showing the configuration of the third exemplary embodiment of the optical communication system of the present invention.

When changing the transmitter-side dispersion compensation amount, circuit coefficient control section 303 transmits a second start instruction for instructing start of change in the receiver-side dispersion compensation amount to circuit coefficient control section 309 via control signal transmission path 112. Then, when a predetermined time elapses after transmitting the second start instruction, circuit coefficient control section 303 changes the transmitter-side dispersion compensation amount in transmitter-side filter section 304.

Circuit coefficient control section 309 which has received the second start instruction transmitted from circuit coefficient control section 303 changes the receiver-side dispersion compensation amount in receiver filter section 311 when a predetermined time elapses after receiving the second start instruction.

In this exemplary embodiment, when compensation of the dispersion amount of transmission path 107 is completed by causing the transmitter-side dispersion compensation amount and the receiver-side dispersion compensation amount to change in synchronization with each other, using a second start instruction, the operation of causing the receiver-side dispersion compensation amount and the transmitter-side dispersion compensation amount to change in synchronization with each other in order to decrease the absolute value of the receiver-side dispersion compensation amount is performed as described in the above first exemplary embodiment.

Thus, in this exemplary embodiment, optical transmitter 201 instructs optical receiver 208 to change the receiver-side dispersion compensation amount using control signal transmission path 112. Therefore, it is possible to compensate for the dispersion amount of transmission path 107 quickly and at a more accurate timing without changing the bit rate of transmission path 107.

In this exemplary embodiment, however, there is a possibility that, if the transmission delay of control signal transmission path 112 and that of transmission path 107 differ due to fluctuation and the like, there may be difference between the timing of changing the transmitter-side dispersion compensation amount in transmitter-side filter section 304 and the timing of changing the receiver-side dispersion compensation amount in receiver filter section 311. In order to prevent deterioration of the quality of a signal even when this difference occurs, it is necessary to minimize deterioration of the quality of the signal, for example, by changing the transmitter-side dispersion compensation amount and the receiver-side dispersion compensation amount little by little at multiple stages.

Fourth Exemplary Embodiment

In the first to third exemplary embodiments described above, the receiver-side dispersion compensation amount in a receiver filter and the transmitter-side dispersion compensation amount in a transmitter-side filter are changed at the same time. In this case, it is necessary to change the filter coefficients of the transversal filters included in the transmitter-side filter section and the receiver filter section at the same time. However, both the transmitter-side filter section and the receiver filter section are required to perform filter processing of the in-phase components and orthogonal components of signals inputted to them, and therefore, the number of tap coefficients set for each is enormous. Especially in the case where great change in the filter coefficient accompanies slight change in the dispersion amount caused by the filter processing, it is difficult to stably change the dispersion compensation amount unless high-accuracy control is performed.

In a fourth exemplary embodiment described below, each of a transmitter-side filter section and a receiver filter section is divided into two to divide the dispersion compensation amount compensated for in the transmitter-side filter section and the receiver filter section into two to reduce the frequency of updating the tap coefficient.

Transversal filters included in the transmitter-side filter section and the receiver filter section perform inverse function processing of the transfer function of transmission path 107. Specifically, multiplication may be performed by a multiplier for output of each delay element, with the value of an impulse response coefficient obtained by inverse Fourier transformation of an inverse function as a tap coefficient value.

At this time, if the dispersion amount D (ps/nm) of chromatic dispersion is in the relationship indicated by a formula (1) shown below, with a bit rate B (Gbps) of a transmitted signal, most of parts of the real part of the impulse response of the inverse transfer function are 0.

[Formula 1]

$$D = (2*n) * \frac{K}{B^2} \quad \text{(n is a natural number.)} \tag{1}$$

In the above formula (1), K is a constant dependent on the wavelength of an optical signal and is approximately 62500 in the case of the wavelength of 1500 nm.

Figure 8:
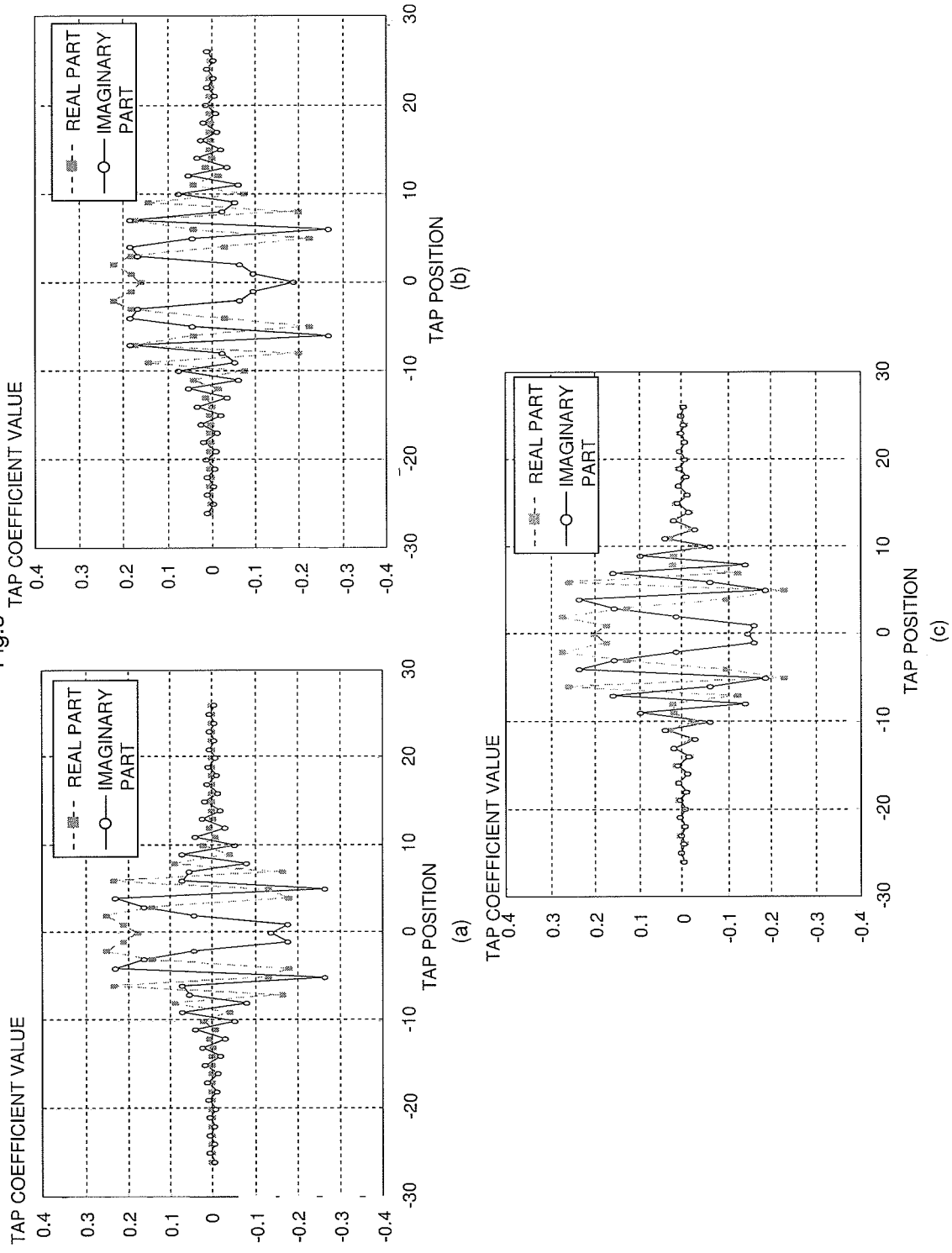
FIG. 8 is a diagram showing an example of the values of the coefficients of the real part and imaginary part of an impulse response at each tap in the case where the delay interval of the transversal filter is 50 ps for a bit rate of 10 Gbps.

FIG. 8 is a diagram showing an example of the values of coefficients of the real part and imaginary part of an impulse response at each tap in the case where the delay interval of the transversal filter is 50 ps for a bit rate of 10 Gbps. FIG. 8(a) is a diagram showing the values of the coefficients of the real part and imaginary part of the impulse response at each tap when the dispersion amount is 5000 ps/nm (n=4); FIG. 8(b) is a diagram showing the values of the coefficients of the real part and imaginary part of the impulse response at each tap when the dispersion amount is 6250 ps/nm (n=5); and FIG. 8(c) is a diagram showing the values of the coefficients of the real part and imaginary part of the impulse response at each tap when the dispersion amount is 5350 ps/nm. In FIG. 8, the vertical axis indicates the values of the coefficients of the real part and imaginary part of the impulse response at each tap, and it is expressed as tap coefficient value in the figure.

In the example shown in FIG. 8(a), the coefficient value of the real part is substantially 0 at and after the twelfth tap from the center. In the example shown in FIG. 8(b), the coefficient value of the real part is substantially 0 at and after the fourteenth tap from the center.

In comparison, in the example shown in FIG. 8(c), the coefficient value of the real part indicates a value larger than 0 even at and after the twentieth tap from the center.

Thus, by changing the transversal filters at intervals in accordance with the above formula (1), the number of taps with the tap coefficient value of 0 can be increased. By utilizing this property, the transmitter-side filter section and the receiver filter section are each divided into two, and, in one transmitter-side filter section and one receiver filter section, the dispersion amount corresponding to a constant times $2K/B^2$ which is calculated by changing the value of n in the above formula (1) is compensated for at steps. In the other transmitter-side filter section and the other receiver filter section, a slight dispersion amount other than the dispersion amount corresponding to a constant times $2K/B^2$ which is calculated by changing the value of n in the above formula (1) is fixedly compensated for. Thereby, the frequency of updating the tap coefficient can be reduced.

Figure 9:
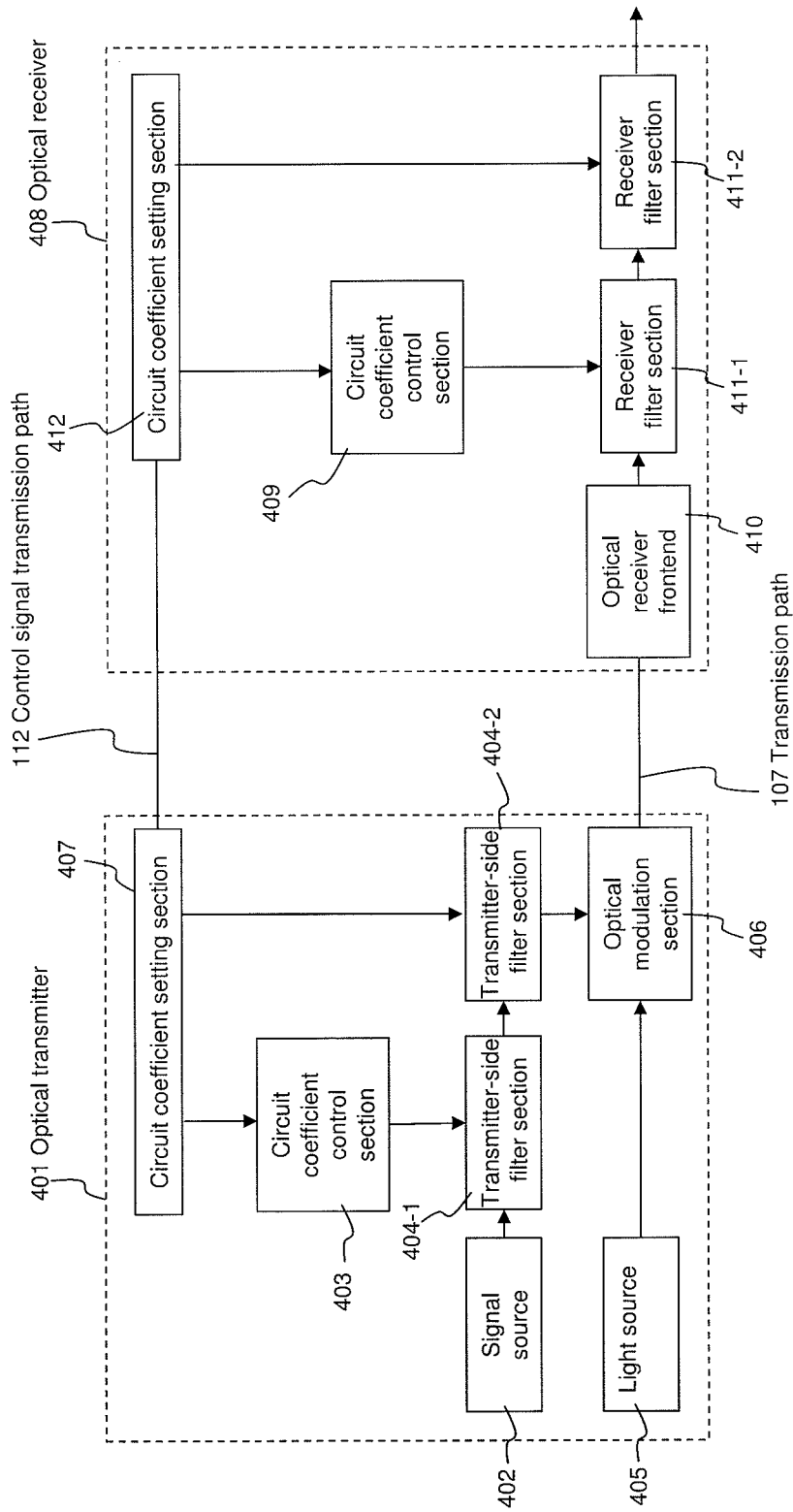
FIG. 9 is a block diagram showing the configuration of a fourth exemplary embodiment of the optical communication system of the present invention.

FIG. 9 is a block diagram showing the configuration of the fourth exemplary embodiment of the optical communication system of the present invention.

In comparison with the optical communication systems of the first to third exemplary embodiments shown in FIGS. 2, 6 and 7, the optical communication system of this exemplary embodiment differs in that, in optical transmitter 401, a transmitter-side filter section is divided into transmitter-side filter section 404-1 which is a first transmitter-side filter section and transmitter-side filter section 404-2 which is a second transmitter-side filter section, and differs in that there is provided circuit coefficient setting section 407, as shown in FIG. 9. The optical communication system also differs in that, in optical receiver 408, a receiver filter section is divided into receiver filter section 411-1 which is a first receiver filter section and receiver filter section 411-2 which is a second receiver filter section, and differs in that there is provided circuit coefficient setting section 412.

Circuit coefficient setting section 407 outputs a tap coefficient to be used by transmitter-side filter sections 404-1 and 404-2 at the time of performing compensation, to circuit coefficient control section 403 and transmitter-side filter section 404-2.

Transmitter-side filter section 404-1 gives a signal corresponding to a first transmitter-side dispersion compensation amount for compensating at steps for the dispersion amount corresponding to a constant times 2K/B² which is calculated by changing the value of n in the above formula (1), to a digital data signal outputted from signal source 402. Then, transmitter-side filter section 404-1 outputs the digital data signal to which the first transmitter-side dispersion compensation amount is given, to transmitter-side filter section 404-2 as a first transmitter-side compensated signal.

Transmitter-side filter section 404-2 gives a signal corresponding to a second transmitter-side dispersion compensation amount for fixedly compensating for a slight dispersion amount other than the dispersion amount corresponding to a constant times 2K/B² which is calculated by changing the value of n in the above formula (1), to the first transmitter-side compensated signal outputted from transmitter-side filter section 404-1. Then, transmitter-side filter section 404-2 outputs the first transmitter-side compensated signal to which the second transmitter-side dispersion compensation amount is given, to optical modulation section 406 as a transmitted signal. The circuit scale of transmitter-side filter section 404-2 is small because it only compensates for a slight dispersion amount.

Circuit coefficient setting section 412 outputs a tap coefficient to be used by receiver filter sections 411-1 and 411-2 at the time of performing compensation, to circuit coefficient control section 409 and receiver filter section 411-2.

Receiver filter section 411-1 gives a signal corresponding to a first receiver-side dispersion compensation amount for compensating at steps for the dispersion amount corresponding to a constant times 2K/B² which is calculated by changing the value of n in the above formula (1), to a received signal outputted from optical receiver frontend 410. Then, receiver filter section 411-1 outputs the received signal to which the first receiver-side dispersion compensation amount is given, to receiver filter section 411-2 as a first receiver-side compensated signal.

Receiver filter section 411-2 gives a signal corresponding to a second receiver-side dispersion compensation amount for fixedly compensating for a slight dispersion amount other than the dispersion amount corresponding to a constant times 2K/B² which is calculated by changing the value of n in the above formula (1), to the first receiver-side compensated signal outputted from receiver filter section 411-1 and outputs the first receiver-side compensated signal. The circuit scale of receiver filter section 411-2 is small because it only compensates for a slight dispersion amount.

Thus, in this exemplary embodiment, the transmitter-side filter section and the receiver filter section are each divided into two; transmitter-side filter section 404-1 and receiver filter section 411-1 compensate for the dispersion amount corresponding to a constant times a predetermined dispersion amount; and transmitter-side filter section 404-2 and receiver filter section 411-2 fixedly compensate for the dispersion amount other than the dispersion amount corresponding to a constant times the predetermined dispersion amount. Thereby, the frequency of updating the tap coefficient can be reduced.

In this exemplary embodiment, a lot of coefficient values of a real part can be caused to be 0 by compensating at steps for the dispersion amount corresponding to a constant times 2K/B² which is calculated by changing the value of n in the above formula (1).

Here, by compensating at steps for the dispersion amount corresponding to a constant times 2K/B² which is calculated by changing the value of n in a formula (2) shown below, a lot of coefficient values of an imaginary part can be caused to be 0, contrary to the case described above.

[Formula 2]

$$D = (2*n - 1) * \frac{K}{B^2} \quad \text{(n is a natural number.)} \quad (2)$$

Figure 10:
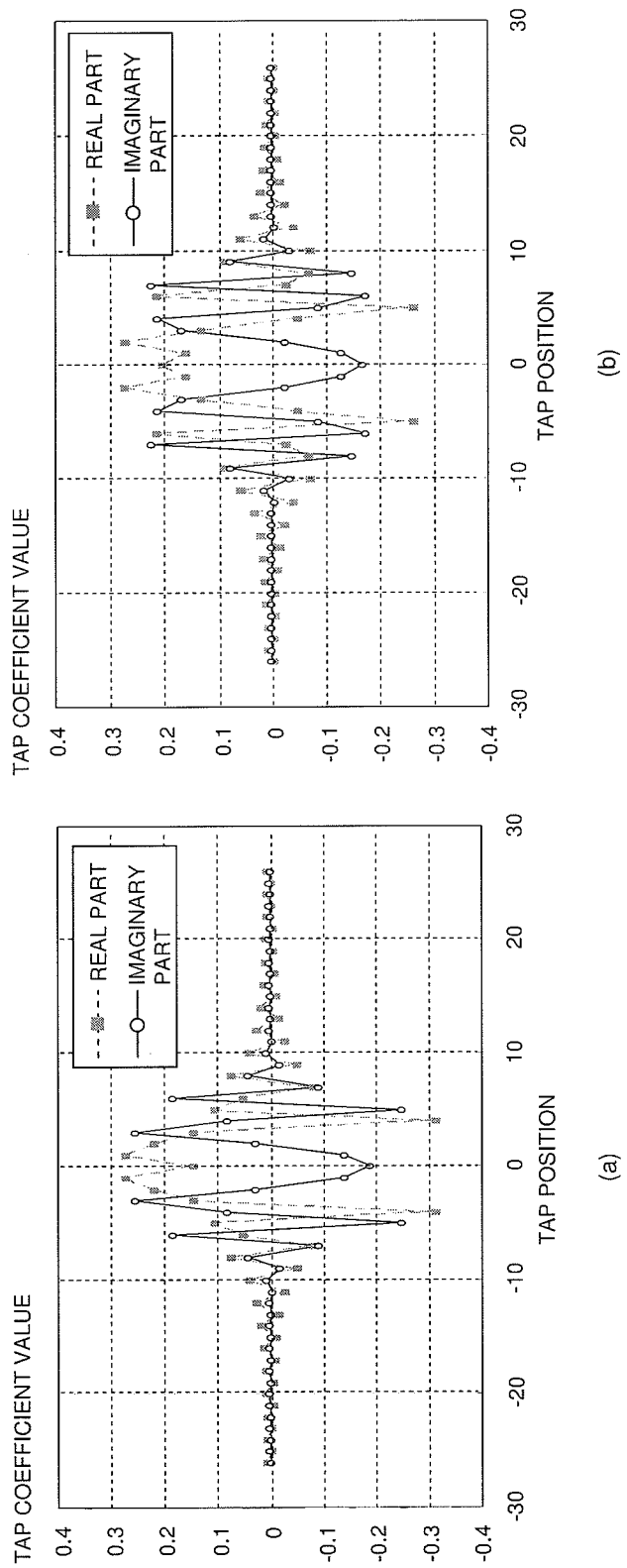
FIG. 10 is a diagram showing another example of the values of the coefficients of the real part and imaginary part of an impulse response at each tap in the case where the delay interval of the transversal filter is 50 ps for a bit rate of 10 Gbps.

FIG. 10 is a diagram showing another example of the values of the coefficients of the real part and imaginary part of an impulse response at each tap in the case where the delay interval of the transversal filter is 50 ps for a bit rate of 10 Gbps. FIG. 10(a) is a diagram showing the values of the coefficients of the real part and imaginary part of the impulse response at each tap when the dispersion amount is 4375 (ps/nm) (n=4), and FIG. 10(b) is a diagram showing the values of the coefficients of the real part and imaginary part of the impulse response at each tap when the dispersion amount is 5675 (ps/nm) (n=5). In FIG. 10, the vertical axis indicates the values of the coefficients of the real part and imaginary part of the impulse response at each tap, and it is expressed as a tap coefficient value in the figure.

In the example shown in FIG. 10(a), the coefficient value of the imaginary part is substantially 0 at and after the eleventh tap from the center. In the example shown in FIG. 10(b), the coefficient value of the imaginary part is substantially 0 at and after the thirteenth tap from the center.

It is apparent that advantages similar to the case described above can be obtained by utilizing this property.

This application claims priority based on Japanese Patent Application No. 2009-023703 filed on Feb. 4, 2009, the disclosure of which is hereby incorporated by reference thereto in its entirety.

The invention claimed is:

1. An optical communication system, comprising:
an optical transmitter configured to modulate an electric signal to an optical signal and to transmit the optical signal, an optical receiver configured to receive the optical signal via a first transmission path, and
a second transmission path connecting said optical transmitter and said optical receiver;
said optical transmitter comprising:
   a transmitter-side filter section that gives a signal corresponding to the transmitter-side dispersion compensation amount to the electric signal and outputs the electric signal as a transmitted signal;
   a first circuit coefficient control section that changes the transmitter-side dispersion compensation amount; and
   an optical modulation section that modulates the transmitted signal outputted from the transmitter-side filter section and transmits the modulated transmitted signal to said optical receiver as the optical signal; and
said optical receiver comprising:
   an optical receiver frontend that receives the optical signal transmitted from the optical modulation section and outputs a received signal obtained by converting the received optical signal to an electric signal;
   a receiver filter section that detects the dispersion amount of the received signal outputted from the optical receiver frontend, gives a signal corresponding to the receiver-side dispersion compensation amount to the received signal according to the detected dispersion amount and outputs the received signal; and
   a second circuit coefficient control section that monitors the dispersion amount detected by the receiver filter section and changes the receiver-side dispersion compensation amount;
wherein:
   when a transmitter-side dispersion compensation amount, for compensating for the dispersion amount of chromatic dispersion caused by the optical signal passing through said first transmission path, is neither a predetermined maximum value nor a predetermined minimum value, and when a change in the dispersion amount is eliminated, said optical transmitter and said optical receiver:
      decrease the absolute value of a receiver-side dispersion compensation amount; and
      while keeping constant the total value of the transmitter-side dispersion compensation amount, for compensating for the dispersion amount by said optical transmitter, and the receiver-side dispersion compensation amount for compensating for the dispersion amount by said optical receiver;
   when a change in the dispersion amount is nearly eliminated, the second circuit coefficient control section transmits a first start instruction for changing the transmitter-side dispersion compensation amount toward the direction of decreasing the absolute value of the receiver-side dispersion compensation amount, to the first circuit coefficient control section via said second transmission path to change the receiver-side dispersion compensation amount toward the direction of decreasing the absolute value of the receiver-side dispersion compensation amount while keeping the total value of the receiver-side dispersion compensation amount and the transmitter-side dispersion compensation amount substantially constant; and
   when receiving the first start instruction transmitted from the second circuit coefficient control section, the first circuit coefficient control section changes the transmitter-side dispersion compensation amount toward the direction indicated by the start instruction.

2. The optical communication system according to claim 1, wherein
   when detecting that the absolute value of the receiver-side dispersion compensation amount has been minimized, the second circuit coefficient control section transmits a stop instruction for stopping changing the transmitter-side dispersion compensation amount to the first circuit coefficient control section via said second transmission path and stops changing the receiver-side dispersion compensation amount; and
   when receiving the stop instruction transmitted from the second circuit coefficient control section, the first circuit coefficient control section stops changing the transmitter-side dispersion compensation amount.

3. The optical communication system according to claim 1, wherein when detecting a change in the dispersion amount detected by the receiver filter section, the second circuit coefficient control section changes the receiver-side dispersion compensation amount so that the change amount of the change is minimized.

4. The optical communication system according to claim 1, wherein
   said optical transmitter comprises a control start frame insertion section that, at the time of starting a change in the transmitter-side dispersion compensation amount, inserts a control start frame for starting a change in the receiver-side dispersion compensation amount into the electric signal and outputs the electric signal in which the control start frame is inserted and insertion information indicating that the control start frame has been inserted;
   said optical receiver comprises a control start frame detection section that detects the control start frame from the received signal outputted from the optical receiver frontend and outputs detection information indicating that the control start frame has been detected;
   when a predetermined time elapses after accepting the insertion information outputted from the control start frame insertion section, the first circuit coefficient control section changes the transmitter-side dispersion compensation amount; and
   when a predetermined time elapses after accepting the detection information outputted from the control start frame detection section, the second circuit coefficient control section changes the receiver-side dispersion compensation amount.

5. The optical communication system according to claim 1, wherein
   said optical transmitter comprises a control start frame insertion section that inserts a control start frame for starting a change in the receiver-side dispersion compensation amount into the electric signal and outputs the electric signal;
   said optical receiver comprises a control start frame detection section that detects the control start frame from the received signal outputted from the optical receiver frontend and outputs detection information indicating that the control start frame has been detected;
   at the time of starting a change in the transmitter-side dispersion compensation amount, the first circuit coefficient control section instructs the control start frame insertion section to insert the control start frame into the electric signal, and changes the transmitter-side dispersion compensation amount when a predetermined time elapses after giving the instruction; and when a predetermined time elapses after accepting the detection information outputted from the control start frame detection section, the second circuit coefficient control section changes the receiver-side dispersion compensation amount.

6. The optical communication system according to claim 1, wherein at the time of starting a change in the transmitter-side dispersion compensation amount, the first circuit coefficient control section transmits a second start instruction for starting a change in the receiver-side dispersion compensation amount, to the second circuit coefficient control section via said second transmission path, and changes the transmitter-side dispersion compensation amount when a predetermined time elapses after transmitting the second start instruction; and when a predetermined time elapses after receiving the second start instruction transmitted from the first circuit coefficient control section, the second circuit coefficient control section changes the receiver-side dispersion compensation amount.

7. The optical communication system according to claim 1, wherein the transmitter-side filter section is divided into:
a first transmitter-side filter section that gives a signal corresponding to a first transmitter-side dispersion compensation amount for compensating for the dispersion amount corresponding to a constant times a predetermined dispersion amount, to the electric signal, and outputs the electric signal as a first transmitter-side compensated signal; and
a second transmitter-side filter section that gives a signal corresponding to a second transmitter-side dispersion compensation amount for compensating for the dispersion amount other than the dispersion amount corresponding the constant times the predetermined dispersion amount, to the first transmitter-side compensated signal outputted from the first transmitter-side filter section, and outputs the first transmitter-side compensated signal as the transmitted signal; and the receiver filter section is divided into:
a first receiver filter section that gives a signal corresponding to a first receiver-side dispersion compensation amount for compensating for the dispersion amount corresponding to a constant times a predetermined dispersion amount, to the received signal, and outputs the received signal as a first receiver-side compensated signal; and
a second receiver filter section that gives a signal corresponding to a second receiver-side dispersion compensation amount for compensating for the dispersion amount other than the dispersion amount corresponding to the constant times the predetermined dispersion amount, to the first receiver-side compensated signal outputted from the first receiver filter section, and outputs the first receiver-side compensated signal.

8. The optical communication system according to claim 1, wherein the transmitter-side filter section is divided into:
a first transmitter-side filter section that gives a signal corresponding to a first transmitter-side dispersion compensation amount for compensating for the dispersion amount equal to or above a predetermined value, to the electric signal, and outputs the electric signal as a first transmitter-side compensated signal; and a second transmitter-side filter section that gives a signal corresponding to a second transmitter-side dispersion compensation amount for compensating for the dispersion amount with a value smaller than the predetermined value, to the first transmitter-side compensated signal outputted from the first transmitter-side filter section, and outputs the first transmitter-side compensated signal as the transmitted signal; and the receiver filter section is divided into:
a first receiver filter section that gives a signal corresponding to a first receiver-side dispersion compensation amount for compensating for the dispersion amount equal to or above a predetermined value, to the received signal, and outputs the received signal as a first receiver-side compensated signal; and
a second receiver filter section that gives a signal corresponding to a second receiver-side dispersion compensation amount for compensating for the dispersion amount with a value smaller than the predetermined value, to the first receiver-side compensated signal outputted from the first receiver filter section, and outputs the first receiver-side compensated signal.

9. An optical communication method in an optical communication system in which an optical transmitter that modulates an electric signal to an optical signal and transmits the optical signal and an optical receiver that receives the optical signal, are connected via a first transmission path and a second transmission path, the optical communication method comprising:

in a situation in which a transmitter-side dispersion compensation amount for compensating for the dispersion amount of chromatic dispersion caused the optical signal passing through said first transmission path is neither a predetermined maximum value nor a predetermined minimum value, when a change in the dispersion amount is eliminated, decreasing the absolute value of a receiver-side dispersion compensation amount while keeping constant the total value of the transmitter-side dispersion compensation amount for compensating for the dispersion amount by the optical transmitter and the receiver-side dispersion compensation amount for compensating for the dispersion amount by the optical receiver.

10. The optical communication method according to claim 9, comprising:

a transmitter-side compensation step of the optical transmitter giving a signal corresponding to the transmitter-side dispersion compensation amount to the electric signal to cause the electric signal to be a transmitted signal;
a step of the optical transmitter modulating the transmitted signal and transmitting the transmitted signal to the optical receiver as the optical signal;
a step of the optical receiver receiving the optical signal, converting the received optical signal to an electric signal to cause the electric signal to be a received signal;
a step of the optical receiver detecting the dispersion amount of the received signal;
a receiver-side compensation step of the optical receiver giving a signal corresponding to the receiver-side dispersion compensation amount to the received signal according to the detected dispersion amount;
a step of, when a change in the dispersion amount is nearly eliminated, the optical receiver transmitting a first start instruction for changing the transmitter-side dispersion compensation amount toward the direction of decreasing the absolute value of the receiver-side dispersion compensation amount, to the optical transmitter via the second transmission path to change the receiver-side dispersion compensation amount toward the direction of decreasing the absolute value of the receiver-side dispersion compensation amount while keeping the total value of the receiver-side dispersion compensation amount and the transmitter-side dispersion compensation amount substantially constant; and a step of, when receiving the first start instruction, the optical transmitter changing the transmitter-side dispersion compensation amount toward the direction indicated by the first start instruction.

11. The optical communication method according to claim 10, further comprising:

a step of, when detecting that the absolute value of the receiver-side dispersion compensation amount has been minimized, the optical receiver transmitting a stop instruction for stopping changing the transmitter-side dispersion compensation amount to the optical transmitter via the second transmission path and stopping changing the receiver-side dispersion compensation amount; and a step of, when receiving the stop instruction transmitted from the optical receiver, the optical transmitter stopping changing the transmitter-side dispersion compensation amount.

12. The optical communication method according to claim 10, further comprising:

a step of, when detecting a change in the dispersion amount, the optical receiver changing the receiver-side dispersion compensation amount so that the change amount of the change is minimized.

13. The optical communication method according to claim 10, further comprising:

a step of, at the time of starting a change in the transmitter-side dispersion compensation amount, the optical transmitter inserting a control start frame for starting a change in the receiver-side dispersion compensation amount into the electric signal and outputting insertion information indicating that the control start frame has been inserted;

a step of, when a predetermined time elapses after accepting the insertion information, the optical transmitter changing the transmitter-side dispersion compensation amount;

a step of the optical receiver detecting the control start frame from the received signal and outputting detection information indicating that the control start frame has been detected; and a step of, when a predetermined time elapses after accepting the detection information, the optical receiver changing the receiver-side dispersion compensation amount.

14. The optical communication method according to claim 10, further comprising:

a step of, at the time of starting a change in the transmitter-side dispersion compensation amount, the optical transmitter giving an instruction to insert a control start frame for starting a change in the receiver-side dispersion compensation amount into the electric signal;

a step of the optical transmitter inserting the control start frame into the electric signal in response to the instruction;

a step of, when a predetermined time elapses after giving the insertion instruction, the optical transmitter starting a change in the transmitter-side dispersion compensation amount;

a step of the optical receiver detecting the control start frame from the received signal and outputting detection information indicating that the control start frame has been detected; and a step of, when a predetermined time elapses after accepting the detection information, the optical receiver starting a change in the receiver-side dispersion compensation amount.

15. The optical communication method according to claim 10, further comprising:

a step of, at the time of starting a change in the transmitter-side dispersion compensation amount, the optical transmitter transmitting a second start instruction for instructing start of a change in the receiver-side dispersion compensation amount, to the optical receiver via the second transmission path;

a step of, when a predetermined time elapses after transmitting the second start instruction, the optical transmitter changing the transmitter-side dispersion compensation amount; and a step of, when a predetermined time elapses after receiving the second start instruction, the optical receiver changing the receiver-side dispersion compensation amount.

16. The optical communication method according to claim 10, wherein said transmitter-side compensation step comprises:

a first transmitter-side compensation step of giving a signal corresponding to a first transmitter-side dispersion compensation amount for compensating for the dispersion amount corresponding to a constant times a predetermined dispersion amount, to the electric signal to cause the electric signal to be a first transmitter-side compensated signal; and a second transmitter-side compensation step of giving a signal corresponding to a second transmitter-side dispersion compensation amount for compensating for the dispersion amount other than the dispersion amount corresponding to the constant times the predetermined dispersion amount, to the first transmitter-side compensated signal to cause the first transmitter-side compensated signal to be the transmitted signal; and said receiver-side compensation step comprises:

a first receiver-side compensation step of giving a signal corresponding to a first receiver-side dispersion compensation amount for compensating for the dispersion amount corresponding to a constant times a predetermined dispersion amount, to the received signal to cause the received signal to be a first receiver-side compensated signal; and a second receiver-side compensation step of giving a signal corresponding to a second receiver-side dispersion compensation amount for compensating for the dispersion amount other than the dispersion amount corresponding to the constant times the predetermined dispersion amount, to the first receiver-side compensation signal.

17. The optical communication method according to claim 10, wherein said transmitter-side compensation step comprises:

a first transmitter-side compensation step of giving a signal corresponding to a first transmitter-side dispersion compensation amount for compensating for the dispersion amount equal to or above a predetermined value, to the electric signal to cause the electric signal to be a first transmitter-side compensated signal; and a second transmitter-side compensation step of giving a signal corresponding to a second transmitter-side dispersion compensation amount for compensating for the dispersion amount with a value smaller than the predetermined value, to the first transmitter-side compensated signal to cause the first transmitter-side compensated signal to be the transmitted signal; and said receiver-side compensation step comprises:

a first receiver-side compensation step of giving a signal corresponding to a first receiver-side dispersion compensation amount for compensating for the dispersion amount equal to or above a predetermined value, to the received signal to cause the received signal to be a first receiver-side compensated signal; and a second receiver-side compensation step of giving a signal corresponding to a second receiver-side dispersion compensation amount for compensating for the dispersion amount with a value smaller than the predetermined value, to the first receiver-side compensation signal.

* * * * *